United States Patent [19]

Kitoh et al.

[11] Patent Number: 5,728,974
[45] Date of Patent: Mar. 17, 1998

[54] SEALING GROMMET

[75] Inventors: Shunji Kitoh; Chigusa Ichio, both of Yokkaichi, Japan

[73] Assignee: Sumitomo Wiring Systems, Ltd., Japan

[21] Appl. No.: 427,898

[22] Filed: Apr. 26, 1995

[30] Foreign Application Priority Data

Jun. 17, 1994 [JP] Japan .................. 6-159407

[51] Int. Cl.$^6$ .................. H02G 3/18
[52] U.S. Cl. .................. 174/65.55; 285/229; 439/559
[58] Field of Search .................. 174/65 R, 65 SS, 174/65 G, 135, 151, 152 G, 153 R; 248/56, 27.1; 285/158, 223, 229, 368; 439/559, 564, 565, 573; 16/2

[56] References Cited

U.S. PATENT DOCUMENTS 3,548,079  12/1970  Jones .................. 285/158 X
4,627,647  12/1986  Hauff .................. 174/65 G X
5,266,051  11/1993  Chupak .................. 439/559

FOREIGN PATENT DOCUMENTS 14 35 87  12/1990  Japan .

Primary Examiner—Hyung S. Sough
Attorney, Agent, or Firm—Jordan B. Bierman; Bierman, Muserlian and Lucas LLP

[57] ABSTRACT

A grommet for sealing an opening in a partition which having a main body and a fixture. The body has a flexible pocket surrounding the opening into which a skirt on the fixture enters. When the assembled grommet is placed under compression, the skirt forces the pocket against the edge of the opening, thereby providing a reliable waterproof seal. At the same time, the pressure urges a sealing lip on the main body against the partition to provide a watertight seal. Thus, the device is capable of producing two seals, rather than a single seal as is to be found in the prior art. The grommet is of particular use in connection with automotive vehicles.

7 Claims, 4 Drawing Sheets

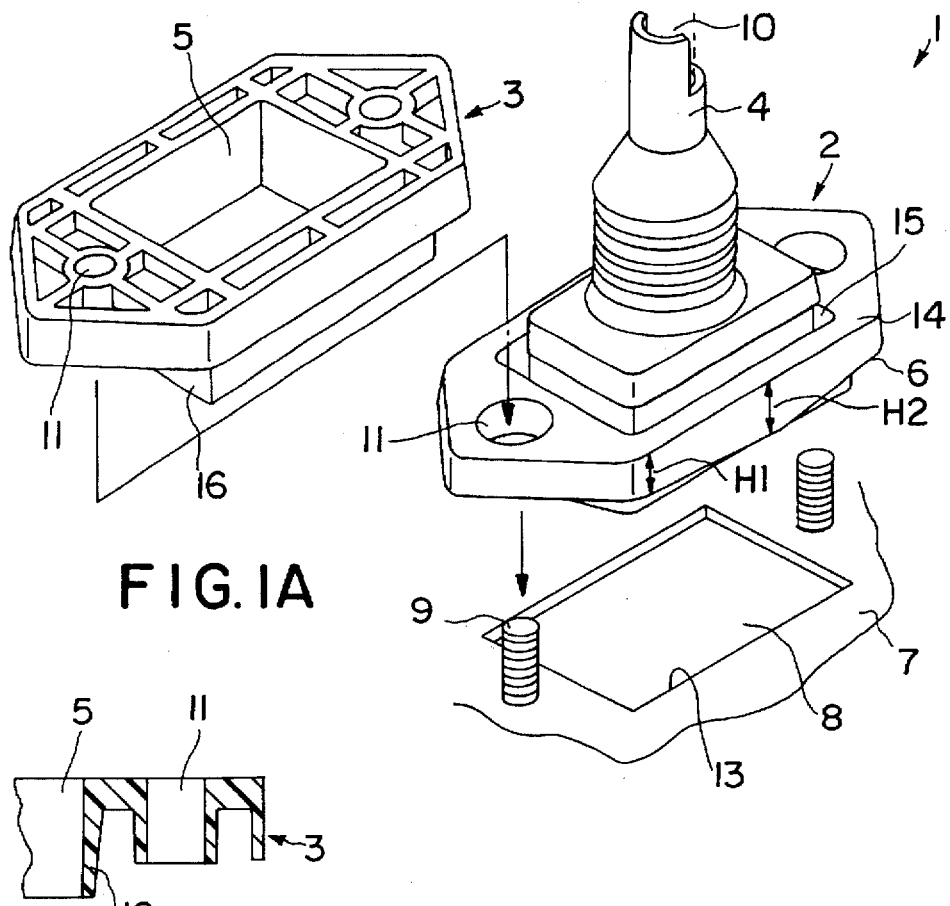
FIG.1A
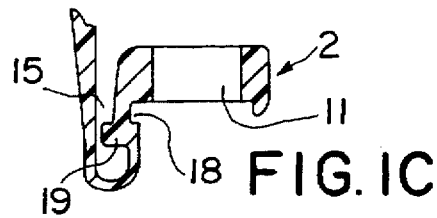
FIG.1B
FIG.1C
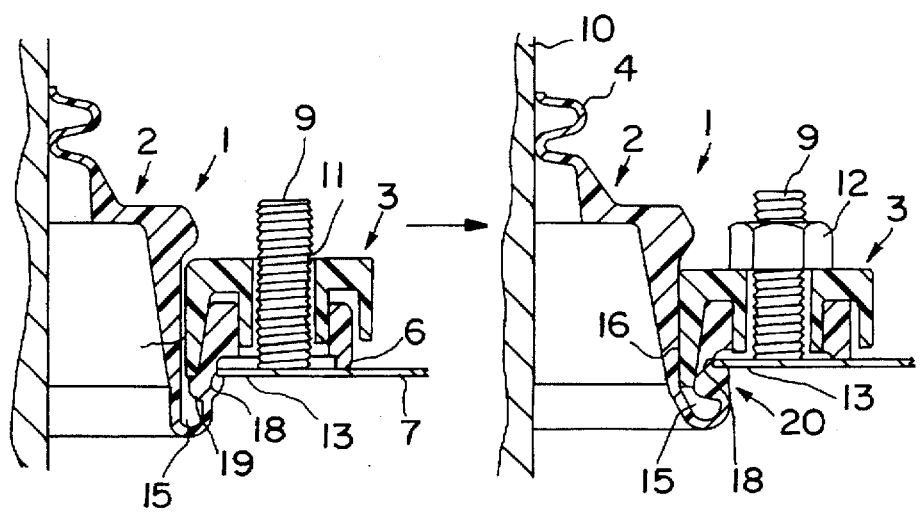
FIG.1D

SEALING GROMMET

This Application claims the benefit of the priority of Japanese Application 6-159407, filed Jun. 17, 1994.

The present invention is directed to a grommet for sealing an opening in a partition. It is particularly useful in attaching a wire harness to—or passing it through—a wall such as is found in an automotive vehicle.

BACKGROUND OF THE INVENTION

As shown in FIG. 5A, grommet 1 comprises main body 2 made of rubber and fixture 3 composed of a hard material such as metal or plastic. Covering tube 4 is located on the upper part of main body 2 and encloses wire harness 10 in a watertight manner. Watertight lip 6 on the lower portion of main body 2 presses tightly against a partition adjacent the periphery of opening 8.

Fixture 3 is placed on main body 2 and covering tube 4, along with wire harness 10, passes through window 5. To secure the device, bolts 9, projecting from partition 7 adjacent both ends of opening 8, pass through holes 11. Nuts (not shown) are tightened on bolts 9 in order to exert the necessary compression to seal the grommet.

Grommet 1 is used for two kinds of openings (see FIGS. 5B and 5C), i.e. opening 8A, which is merely punched through partition 7, and opening 8B which has flange portion 12 bent out of the surrounding plate adjacent opening 8.

It is of importance to reduce the size of units of this kind, since they are frequently used in the assembly of an automotive vehicle. The space allotted is extremely limited and substantial skill is required to affix such grommets to the vehicle.

When the prior art grommet is attached and fixed to the opening in the partition, lip 6 is generally sufficient to make the seal watertight in the vicinity of bolts 9. However, in the central portion, between bolts 9, the clamping force acts indirectly and the seal may not be sufficient. Thus, the prior art grommet is not reliably waterproof.

Moreover, when opening 8B has flange 12, improper formation results in the center line of the flange not being normal to the surface of the partition. Alternatively, its shape can be deformed somewhat. In this situation, if the grommet is attached to the partition, main body 2 is also not normal to the partition and the tendency of the seal to leak is substantially increased.

SUMMARY OF THE INVENTION

It is among the objects of the present invention to provide a grommet which is capable of a watertight seal throughout its area. It is also among the objects of the present invention to provide a watertight seal even when the flange is deformed or not normal to the partition surface.

The grommet according to the present invention comprises a main body and a fixture. The main body has a plate and a lip depending from the underside thereof. The lip surrounds the opening in the partition and is adapted to seal thereagainst under the influence of a compressive force. A flexible pocket, substantially complementary to the sealing edge of the opening, projects into the opening when the lip seals against the partition.

The fixture is a generally planar element, also complementary to the plate and preferably adapted to fit thereover. A skirt depends from the element and is complementary to the pocket. It is intended that the skirt fit into the pocket and, as the compressive force is exerted, cause the pocket to press firmly against the sealing edge of the opening.

Compression is preferably exerted by a pair of stud bolts which project from the partition. Corresponding holes in the main body and fixture permit the bolts to pass therethrough. Nuts on the ends of the bolts are tightened to the desired degree of compression.

In a particularly advantageous form of the invention, a wire harness is attached to the plate of the main body and sealed to the side away from the partition. A window is provided in the fixture (and also in the plate, if necessary) through which the wire harness passes. Thus, the device of the present invention can be used to seal off the opening in the partition, or to attach a wire harness thereto, both in a watertight manner.

In another embodiment of the present invention, the fixture comprises a retainer and an inner body. The former is substantially similar to the fixture of the first embodiment, but is provided with an operating portion at the window edge on the periphery of the retainer window.

The inner body is similarly shaped, having a body window complementary to both the opening in the partition and the retainer window. The skirt consists of a plurality of skirt pieces which are mounted vertically on the body edge and spaced apart peripherally. The skirt pieces have actuators extending above the inner body and sealing members extending below the inner body. The skirt pieces are provided with hinges which are adjacent the inner body. When under compression, the operating portion of the retainer bears against the actuators and causes the skirt pieces to pivot about their hinges so that the sealing members, which fit inside the pocket, press it firmly against the sealing edge of the opening. It has been found advantageous to provide the pocket with a plurality of fine grooves in a surface thereof. This increases the flexibility of the pocket.

BRIEF DESCRIPTION OF THE DRAWINGS

In the accompanying drawings, constituting a part hereof, and in which like reference characters indicate like parts, FIG. 1A is an exploded perspective view of a grommet of the present invention;

FIG. 1B is a cross section of the right hand end of the fixture of FIG. 1A;

FIG. 1C is a view, corresponding to that of FIG. 1B, of the right hand end of the main body of FIG. 1A;

FIG. 1D is a cross sectional view of the right hand half of the grommet of FIG. 1A before and after compression has been applied;

DETAILED DESCRIPTION OF THE INVENTION

Figure 2A:
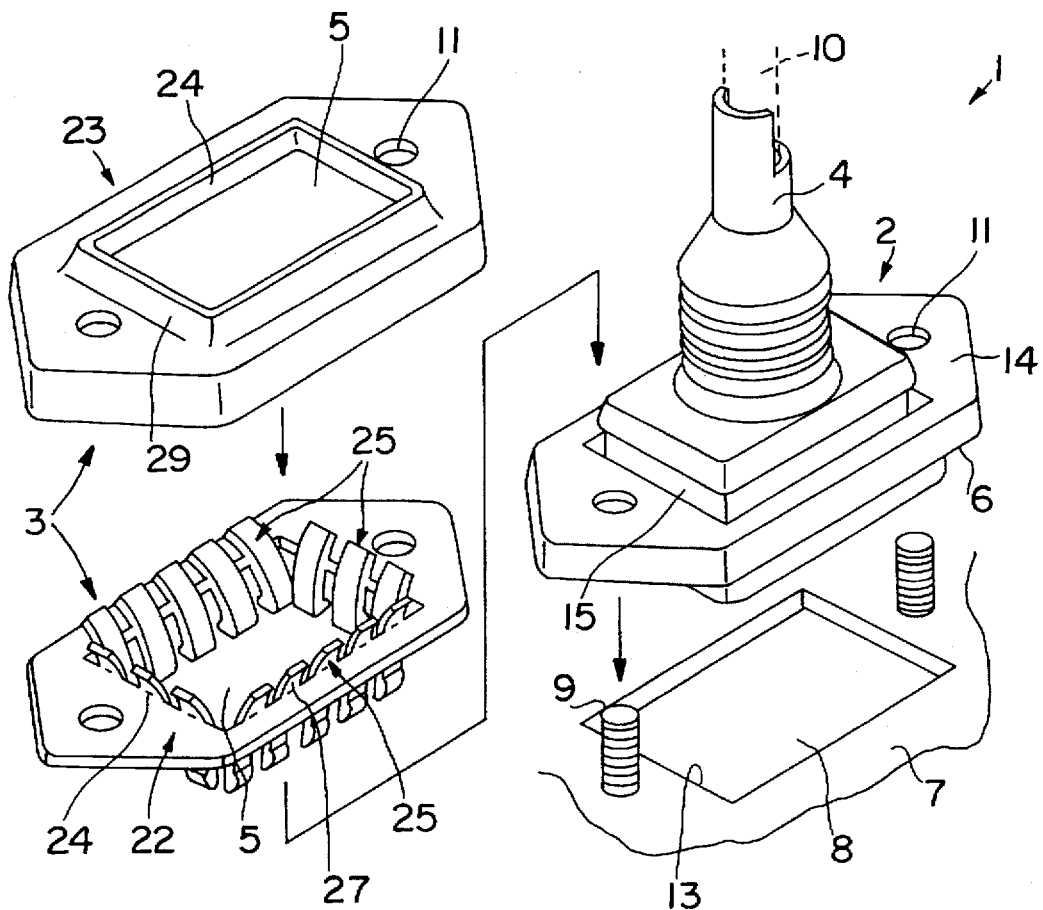
FIG. 2A is a view similar to that of FIG. 1A of another embodiment of the present invention.

Referring more particularly to FIGS. 1A to 1D, grommet 1 comprises main body 2 and fixture 3. Main body 2 is provided with wire harness 10 which is sealed by covering tube 4 to plate 14. Pocket 15 depends therefrom, as does lip 6. In a preferred form of the invention, lip 6 has a greater height H2 in the center than height H1 adjacent the ends. Opening 8 in partition 7 has sealing edge 13 on its periphery. Holes 11 are provided in main body 2 and fixture 3 to receive upstanding stud bolts 9. Skirt 16 depends from fixture 3 and fits into opening 8 when grommet 1 is assembled. It has been found advantageous to provide bump 19 on the inner wall of pocket 15. Fixture window 5 permits wire harness 10 and covering tube 4 to pass therethrough.

In FIG. 1D, the left portion shows grommet 1 assembled before any compression has been applied. Skirt 16 is within pocket 15 and bears against bump 19. Lip 6 touches—but does not seal against—partition 7. Thereafter, nut 12 is threaded onto bolt 9 and tightened. As can be seen on the right portion of FIG. 1D, the compression of fixture 3 causes skirt 16 to enter further into pocket 15. This exerts pressure to the right urging pocket 15 to seal against edge 13. At the same time, the downward pressure forces lip 6 tightly against partition 7. Thus, there are two watertight seals, the first seal between lip 6 and partition 7, and second seal 20.

Figure 2B:
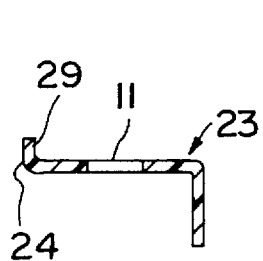
FIG. 2B is a cross section of the right half of the retainer of FIG. 2A.
Figure 2C:
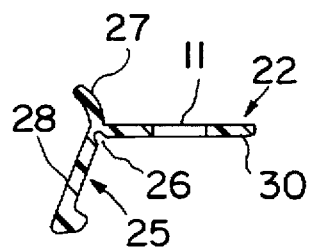
FIG. 2C is a view, similar to that of FIG. 2B, of the inner body of FIG. 2A.

A second embodiment of the present invention is shown in the various FIGS. 2 and 3. In this embodiment, main body 2 and partition 7 are identical to the first embodiment. Fixture 3 consists of retainer 23 and inner body 22. Retainer 23 is very similar to fixture 3 of the principal embodiment. However, window edge 24 having operating portion 29 is at the periphery of window 5. Inner body 22 is of the same general shape as retainer 23 and main body 2, and window 5 is provided, at its periphery, with a plurality of skirt pieces 25. The upper portions of skirt pieces 25 are actuators 27 and the lower portions are sealing pieces 28.

Figure 3A:
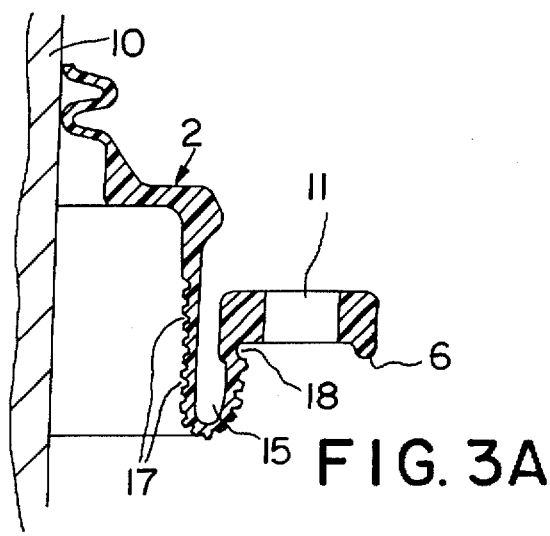
FIG. 3A is a cross sectional view of the right hand end of the main body of FIG. 2A.
Figure 3B:
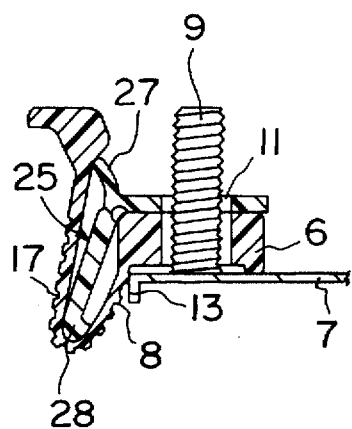
FIGS. 3B and 3C are similar to FIG. 1D but show the second embodiment of the invention.
Figure 3C:
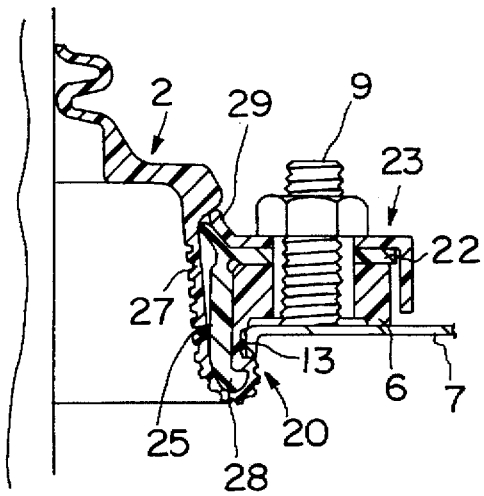
Figure 4:
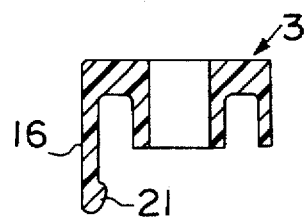
FIG. 4 is a view similar to that of FIG. 1B showing a modification of the fixture or retainer.
Figure 5A:
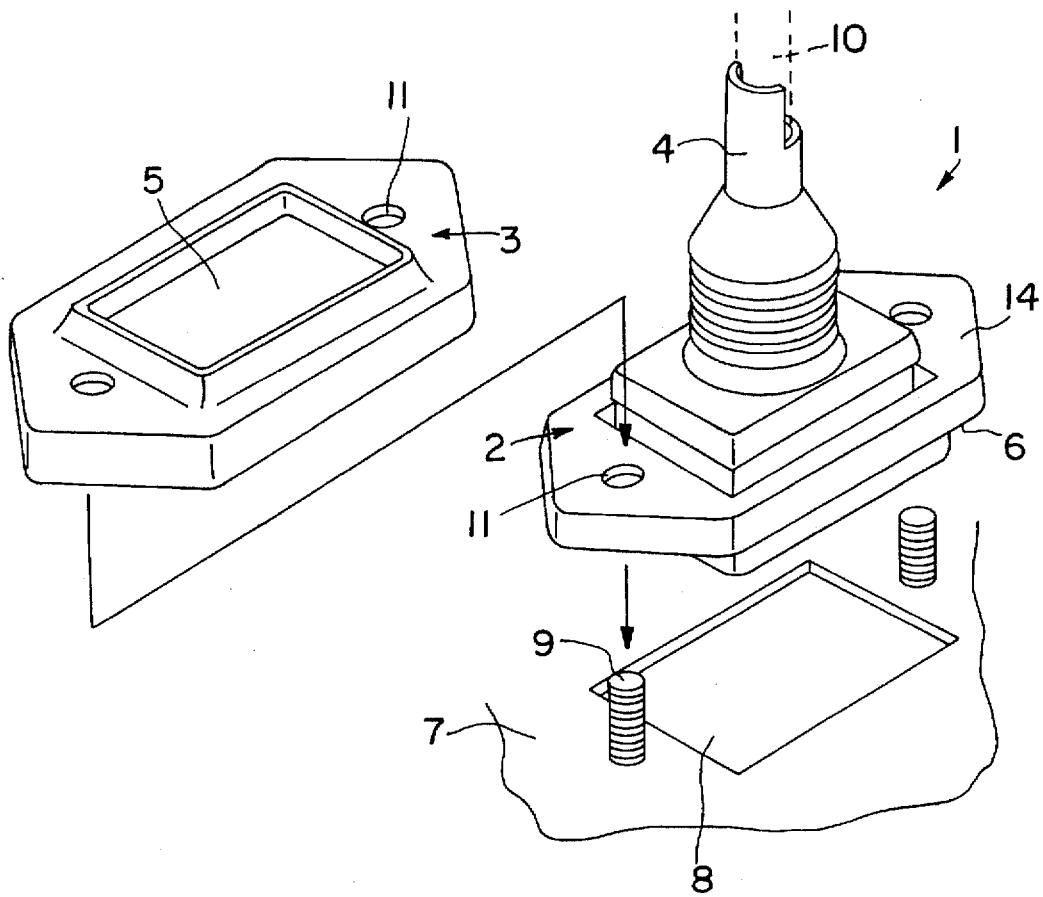
FIGS. 5A, 5B, and 5C are similar to FIGS. 1A and 1D and show the prior art.
Figure 5C:
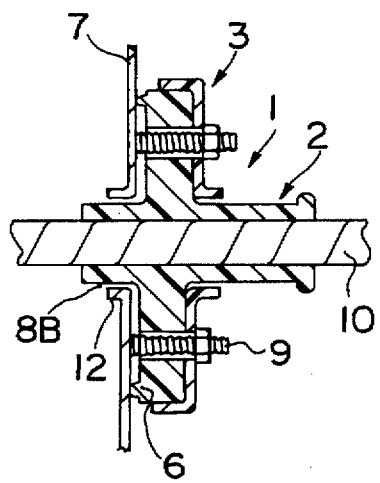
Figure 5B:
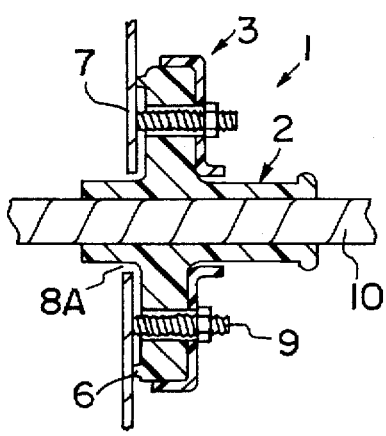

The assembly of this embodiment is to be seen in FIG. 3A, 3B and 3C. Sealing pieces 28 of skirt pieces 25 enter pocket 15. Actuator 27 extends thereabove. Grooves 17 in pocket 15 are provided to improve flexibility. Compressive force is applied (see FIG. 3C) by tightening nut 12 on bolt 9. Retainer 23 compresses inner body 22 and waterproof portion 18. Operating portion 29 bears against actuators 27 which, in turn, cause sealing pieces 28 to pivot about hinge 26. This causes pocket 15 to press firmly against waterproof portion 18 and force it against edge 13 of partition 7. As in the first embodiment, the same compression urges lip 6 firmly against partition 7. Thus, a double seal is provided. In a preferred form of the invention (FIG. 4), projection 21 is located on skirt 16. Projection 21 assists in creating the tight seal of which the present invention is capable and is equally useful in both embodiments.

Such modifications as would be apparent to the person of ordinary skill may be made in the present invention, without departing from the scope or spirit thereof. For example, instead of a plurality of relatively narrow skirt pieces disposed around the periphery of window edge 24, there can be four such pieces, one on each side of the window edge. The grommet of the present invention can be applied to an opening in the partition which is flanged or unflanged.

While only a limited number of specific embodiments of the present invention have been expressly disclosed, it is, nonetheless, to be broadly construed and not to be limited except by the character of the claims appended hereto.

What we claim is:

1. A grommet for sealing an opening in a partition comprising a main body and a fixture, said fixture comprising a retainer and an inner body, said main body comprising a plate; a lip, depending from an under side of said plate, adapted to substantially surround said opening, and adapted to seal against said partition under the influence of a compressive force; and a flexible pocket, adapted to be substantially complementary to a sealing edge of said opening and adapted to project into said opening when said lip seals against said partition, said retainer comprising a first planar element having a retainer window therethrough and a window edge on its periphery, said inner body comprising a second planar element, substantially complementary to said plate and adapted to fit thereover; a body window complementary to said retainer window and having a body edge on its periphery; a plurality of skirt pieces mounted vertically on said body edge and spaced apart peripherally, each of said skirt pieces having a sealing member extending downwardly from said inner body, an actuator projecting upwardly from said inner body, and a hinge between said sealing member and said actuator, an operating portion of said window edge adapted to bear against said actuator to cause said member to urge said pocket sealingly against said sealing edge under said compressive force, and a compressive element adapted to exert said compressive force on said fixture, said main body, and said partition to cause said skirt pieces to urge a portion of said pocket sealingly against said sealing edge and said lip sealingly against said partition.

2. The grommet of claim 1 wherein there are pocket grooves on one side of said pocket whereby flexibility thereof is enhanced.

3. The grommet of claim 1 wherein said compressive element comprises at least one stud bolt to be adjacent said sealing edge of said opening, and at least one hole through said plate and said retainer complementary to said bolt.

4. The grommet of claim 3 wherein said compressive element further comprises a nut on said bolt adapted to be tightened to bear against said retainer.

5. The grommet of claim 3 wherein there are two stud bolts, each of said bolts to be adjacent each end of said sealing edge of said opening and two holes through said plate and said retainer complementary to said bolts.

6. The grommet of claim 1 including a wire attached to said plate and sealed thereto, said wire passing through said body window and said retainer window.

7. The grommet of claim 6 wherein said wire is attached to said plate on an opposite side of said lip.

* * * * *